United States Patent
Yamaguchi

(10) Patent No.: US 6,841,905 B2
(45) Date of Patent: Jan. 11, 2005

(54) LOW-PROFILE, CORELESS MOTOR

(75) Inventor: Tadao Yamaguchi, Isezaki (JP)

(73) Assignee: Tokyo Parts Industrial Co., Ltd., Gunma Prefecture (JP)

( * ) Notice: Subject to any disclaimer, the term of this patent is extended or adjusted under 35 U.S.C. 154(b) by 0 days.

(21) Appl. No.: 10/661,260

(22) Filed: Sep. 11, 2003

(65) Prior Publication Data

US 2004/0051400 A1 Mar. 18, 2004

(30) Foreign Application Priority Data

Sep. 13, 2002 (JP) ........................................ 2002-268722

(51) Int. Cl.[7] ............................. H02K 5/22; H02K 23/58
(52) U.S. Cl. .................................. 310/81; 310/40 MM
(58) Field of Search ............................ 310/81, 40 MM; 340/391.1, 407.1, 384.1, 311.1, 396, 349

(56) References Cited

U.S. PATENT DOCUMENTS 5,471,103 A * 11/1995 Fujii ............................ 310/81
5,942,833 A * 8/1999 Yamaguchi .................. 310/268
6,208,238 B1 * 3/2001 Ohta ....................... 340/391.1

FOREIGN PATENT DOCUMENTS

| JP | 10-215553 | 8/1998 |
| JP | 10-262352 | 9/1998 |
| JP | 2000-166175 | 6/2000 |
| JP | 2002-119914 | 4/2002 |

* cited by examiner

Primary Examiner—Tran Nguyen
(74) Attorney, Agent, or Firm—Jordan and Hamburg LLP

(57) ABSTRACT

Motors are made thinner than conventional by adding a contrivance to a bracket. A housing composed of a case and a bracket is provided and an eccentric rotor and ring magnet are in the housing. A pair of brushes are provided with their base ends thereof anchored to a flexible base at the inside diameter of the magnet. The aforementioned flexible base leads to the outer periphery of the housing as a power-supply terminal, and an opening is provided in the part where the magnet is disposed in the housing. The flexible base leads to a side of the housing through the opening.

16 Claims, 5 Drawing Sheets

LOW-PROFILE, CORELESS MOTOR

BACKGROUND OF THE INVENTION

The present invention pertains to the improvement of a small motor used, for example, as a silent call means, etc., in portable telecommunications equipment and audio equipment (e.g., minidisc players), and it relates to a low-profile coreless motor.

With the adoption of compact, low-profile portable telecommunications equipment and audio equipment (e.g., minidisc players), there also has been a need for compact, low-profile components for mounting in the portable telecommunications equipment. For example, the flat-type vibration motor, which is one means of silent control in portable telecom equipment, is mounted directly on the equipment-side printed-circuit board by means of double-sided tape, an adhesive, etc., so the mounting surface must be flat, and the power-supply terminal that supplies power to the brushes leads to the periphery of the motor. Such a flat-type motor is driven by an axial-direction magnetic field-type ring magnet. This necessitates a power-supply configuration that supplies power to the brushes disposed at the inside diameter of this magnet. As a result, the power-supply configuration that supplies power to the brushes, must be led out between the aforementioned magnet and the bracket, which is part of the housing in which this magnet is mounted.

As disclosed in Japanese Unexamined Patent Application No. 10-262352, such low-profile, coreless vibration motors are such that a recess is formed so as to conform to the shape of the brush base in the bracket by means of press processing, and by embedding the brush base in this recess, the brush base thickness becomes negligible. However, a thick bracket is necessary to form a recess by depressing in press processing. So, in the prior art, the motor thickness has been limited to approximately 2.5 mm. The present invention aims at enabling thinner motors by adding a contrivance to the aforementioned bracket.

SUMMARY OF THE INVENTION

The basic solution to the aforementioned problem can be effected as follows. In a low-profile, coreless motor a housing composed of a case and a bracket is provided, such that a flat, coreless rotor and a ring magnet are housed in this housing, the ring magnet being axially spaced from the coreless rotor, such that a pair of brushes are provided, with their base ends anchored to the flexible base at the inside diameter of the magnet and with their tip ends disposed on the aforementioned rotor in sliding-contact with the printed-wiring commutator. A part of the aforementioned flexible base leads to the outer periphery of the housing as a power-supply terminal, a transparent opening is provided in the part where the magnet is disposed in the aforementioned housing and part of the aforementioned flexible base leads to the side of the housing through this transparent opening.

Also, it is configured such that a support that supports the aforementioned power-supply terminal is provided in the aforementioned bracket, and the aforementioned transparent opening is similarly positioned in the radial direction and its width is less than that of the support.

In this manner, it is possible to fabricate the transparent opening without adopting an impractical means such as pressing with a press, even if the bracket is thinner than conventional. Consequently, it is possible to easily configure a brush base leading means, that is, it is possible to easily lead a flexible brush base with a thickness of approximately 0.15 mm, through the transparent opening and to the outer periphery of the motor so the thickness is not increased.

Such a motor can be converted to a vibration motor in that the aforementioned rotor is eccentric, and the shaft that supports this eccentric rotor does not protrude from the housing. In this manner, the shaft can be supported securely, thereby preventing shaft deformation even if the rotor is subjected to a shock (e.g., a fall). The aforementioned brushes, that is, at least the brush base, are disposed on the flexible base so that their base ends reach the transparent opening side. In this manner, the brush base is depressed at the transparent opening and the magnet, so that, even when a downward force is exerted on the brush sliding-contact area (FIG. 1), it is possible to prevent floating of the brush base of the brush holding part.

DESCRIPTION OF THE PREFERRED EMBODIMENTS

Figure 1:
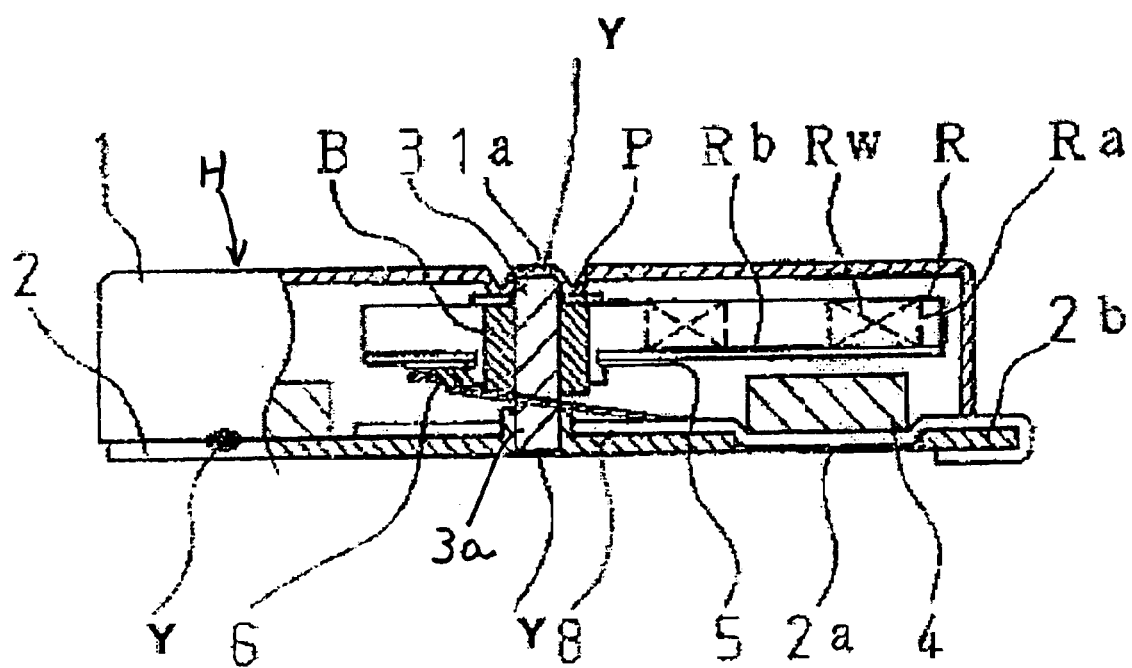
FIG. 1 is a cross-sectional view of a flat, coreless vibration motor, showing a first embodiment of the invention.

Embodiments of the invention will be explained with reference to the aforementioned drawings. FIG. 1 shows a low-profile, coreless vibration motor configured with a thickness, for example, of approximately 2 mm. In this motor, a housing H includes a case 1, which is formed by drawing a thin (e.g. 0.15-mm) magnetic stainless steel sheet, and a bracket 2 (e.g. a thickness of approx. 0.2 mm), which is made of a magnetic stainless steel sheet installed in the opening of this case 1. In the housing H, a shaft 3 (e.g. a diameter of approx. 0.5 mm) is anchored at the center of bracket 2, and a thin ring-shaped magnet 4 is mounted radially outwardly of this shaft 3 on bracket 2. The configuration is such that shaft 3 is anchored to bracket 2, and the shaft base end 3a is anchored by press-fitting it into the center of bracket 2 or it is anchored by means of a laser weld Y instead of press-fitting.

Eccentric rotor R (e.g. a thickness of approx. 0.6 mm) is mounted on shaft 3 in free rotation. Eccentric rotor R faces ring magnet 4 via a gap in the axial direction.

Figure 3:
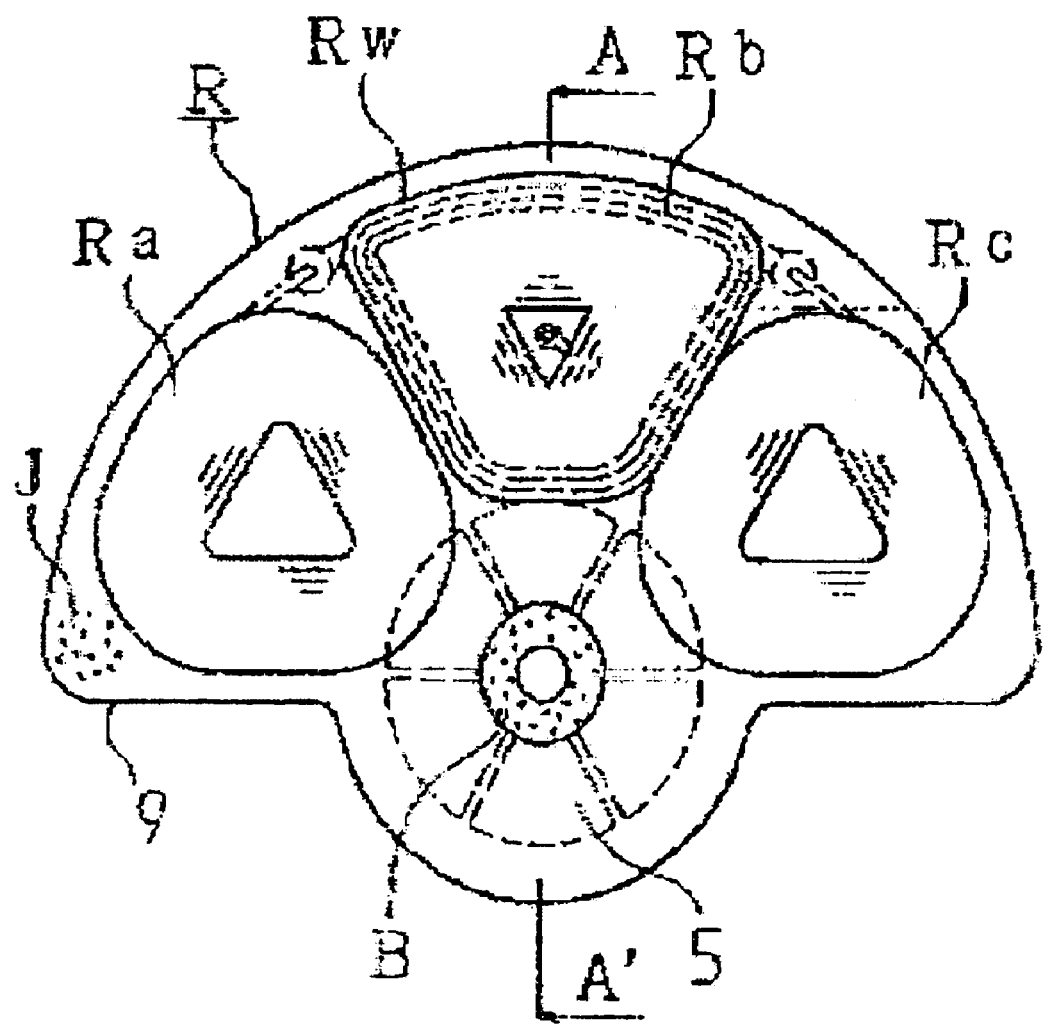
FIG. 3 is a top view of the eccentric motor of FIG. 1.

The eccentric rotor R, as shown in FIG. 3 and discussed later, includes three armature coils Ra, Rb, Rc, one eccentric weight Rw anchored to armature coil Rb, and bearing B integrally formed by using resin on a flexible printed-wiring board 9 (FIG. 3). Commutator 5 is print-formed on flexible printed wiring board 9. Eccentric rotor R is powered by a pair of brushes 6, 7 via this commutator 5. In FIG. 1, eccentric rotor R is represented by the cross-sectional view A—A in FIG. 3.

Figure 2:
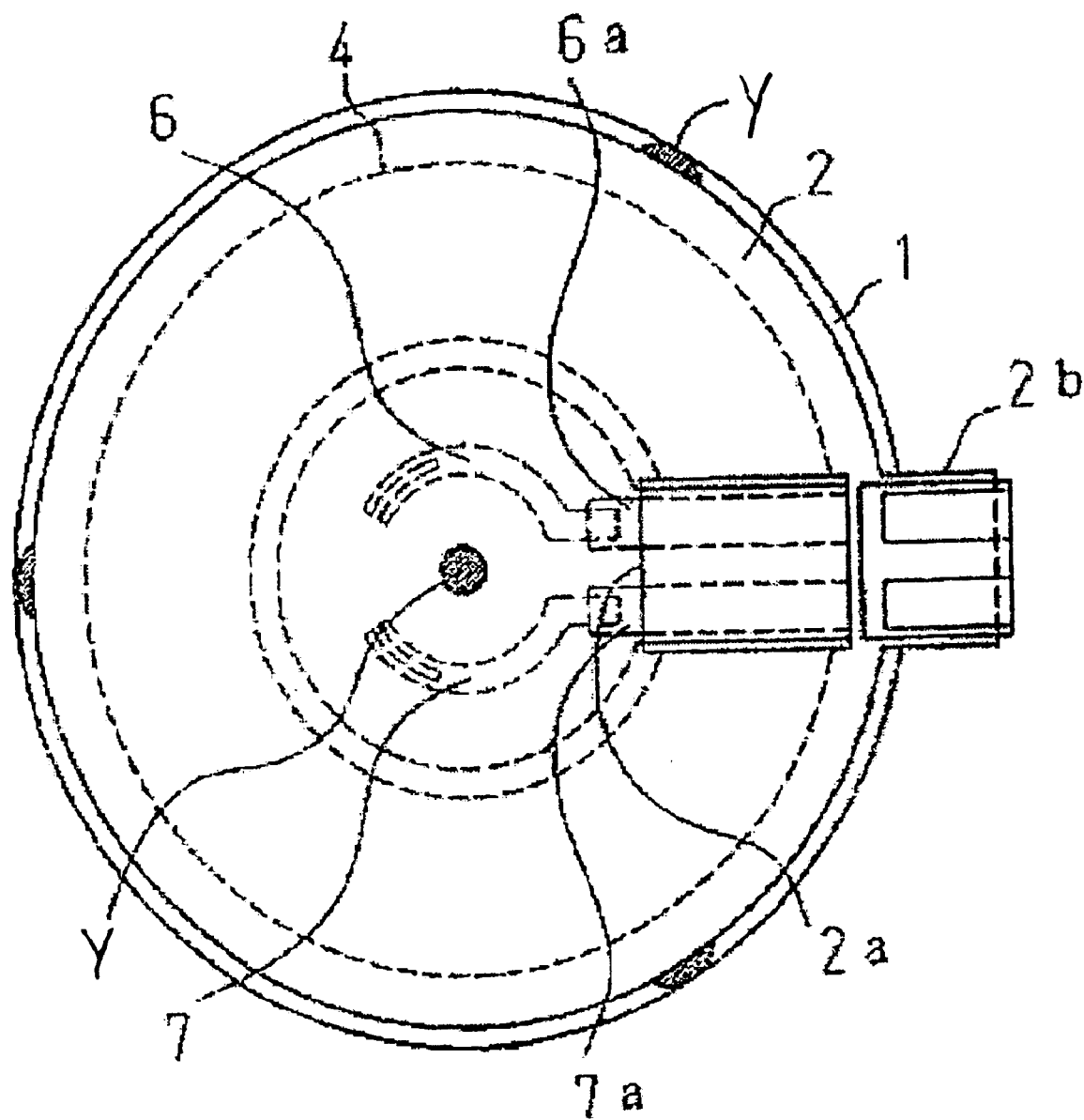
FIG. 2 is a bottom view showing the characteristics of the power-supply configuration of FIG. 1.

As shown in FIGS. 1 and 2, a flexible base 8 is disposed on bracket 2. Flexible base 8 is composed of a so-called flexible wiring substrate, and patterns 6a, 7a are printed on the flexible base 8. This flexible base 8 is formed in a circle at the inside diameter of magnet 4. Brushes 6, 7 are connected electrically to the inside diameter area of magnet 4 by patterns 6a, 7a. The area where the patterns 6a, 7a are printed extend from this circular area to the side periphery of the housing H and lead to the outside of housing H.

Transparent opening 2a is provided in bracket 2 at a position where the aforementioned magnet 4 and flexible base 8 overlap. Flexible base 8 and patterns 6a, 7a extend in the radial direction and lead out of case 1 (i.e., housing H) via this opening 2a.

By providing opening 2a in the area where magnet 4 of bracket 2 is mounted, it is possible to easily maintain a gap via which flexible base 8 leads out of housing H from between magnet 4 and the bracket 2. Adhesive is applied to predetermined surfaces, so it is advisable to adhere and anchor the aforementioned flexible base 8 to the bracket 2 and magnet 4.

In the present embodiment, brushes 6, 7 are anchored to flexible base 8 by connecting their base ends to patterns 6a, 7a, by means of soldering, spot-welding, etc. If these base ends are disposed between shaft 3 and opening 2a, flexible base 8 is held by opening 2a and magnet 4, thereby preventing its floating, even if a downward force is applied (in the figure) to the brush sliding-contact area.

The power-supply terminal of flexible base 8 is folded back in the area of tongue 2b, which projects from bracket 2, as a support that supports the power-supply terminal. This exposes the solder wires in three directions, thereby allowing them to be easily soldered to the equipment-side printed-wiring board.

Burring transparent opening 1a is provided in case 1 and the other end of the aforementioned narrow stainless steel shaft 3 is mounted in its center. A member P (e.g. made of polyesterimide) is disposed around this transparent opening 1a. The pressure-contact forces of the aforementioned pair of brushes 6, 7 keeps the aforementioned eccentric rotor R in sliding-contact with member P via bearing B. As a result, rotor 3 is continuously biased toward case 1, and it is retained in free rotation by member P, so it never directly contacts case 1. Also, it is possible to continuously maintain a uniform gap between rotor R and magnet 4, so the rotational position of rotor R does not fluctuate, thereby stably supporting rotation.

The other end of the aforementioned shaft 3 is laser-welded to the aforementioned case 1, in the area of the aforementioned burring transparent opening 1a. Consequently, even if the aforementioned shaft 3 is subjected to a shock, such as the dropping of the aforementioned eccentric rotor, there is no danger of its detachment from transparent opening 1a.

FIG. 3 shows the structure of eccentric rotor R. In this eccentric rotor R, three air-core armature coils Ra, Rb, Rc are adhered after being unevenly distributed on one side of thin-film-type, flexible printed-wiring board 9 whose surface was coated with a thin (e.g. approx. 0.05-mm) coating of adhesive. The middle air-core armature coil Rb is formed thinly as a layer of winding or a printed-wiring pattern formed on both sides. A weight Rw (e.g. made of tungsten alloy and having a density of approx. 15) is mounted here, and it is integrated with bearing B by using resin J.

Regarding commutator 5 that was print-formed on flexible printed-wiring board 9, when integrating it with a 4-pole magnet magnetized alternately N and S, it is configured by forming 6-pole segments that are opposed and shorted. When integrating it with a magnet composed of eight magnetic poles, a commonly known material composed of 12-pole segments is used.

Figure 4:
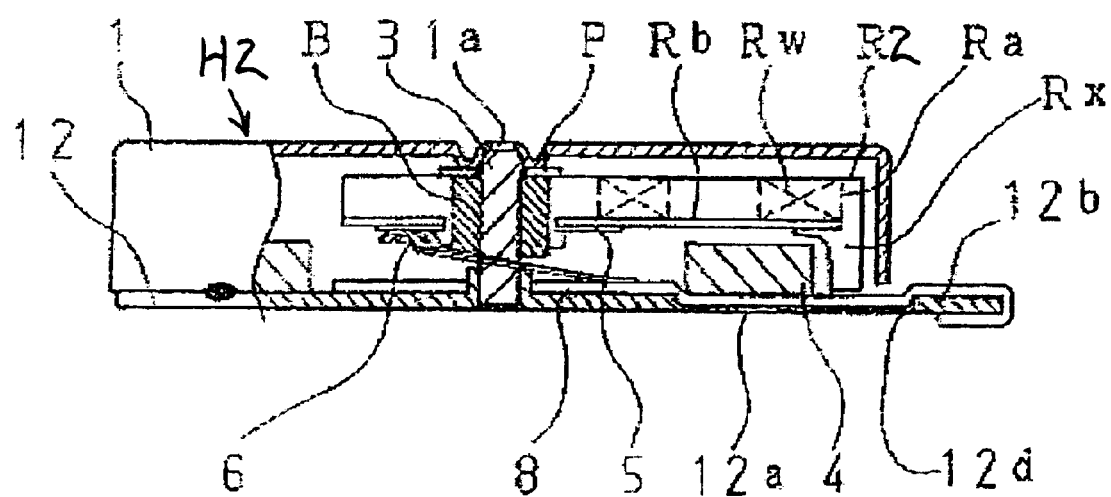
FIG. 4 is a cross-sectional view of a flat, coreless, vibration motor, showing another embodiment of the present invention.
Figure 5:
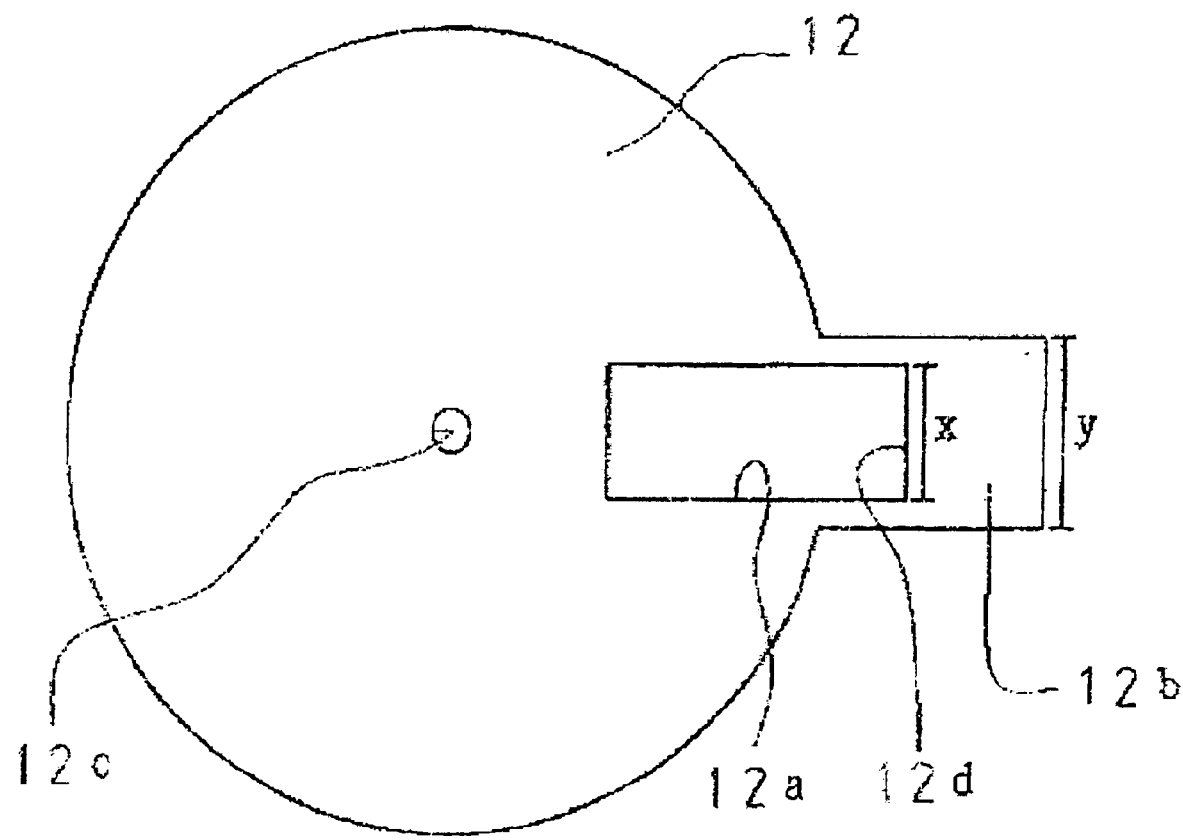
FIG. 5 is a diagram showing the characteristics of the bracket of FIG. 4.

A second embodiment of the present invention is shown in FIGS. 4 and 5, wherein FIG. 4 is a cross-sectional view of a flat, coreless vibration motor and FIG. 5 is a diagram showing the characteristics of the bracket of FIG. 4. The symbols used in FIGS. 1–3 are also used to indicate the components identical to those used in the first embodiment, but the descriptions thereof are omitted.

As is evident in FIG. 4, reinforcing part Rx is installed on radial peripheral vicinity of rotor R2, so as to protrude toward bracket 12. This reinforcing part Rx reinforces the outer periphery of rotor R2 and increases the eccentricity of rotor R2, thereby generating larger vibrations. It is provided after being integrally formed with the rotor R2 by means of molding, for example.

As is evident in FIGS. 4 and 5, transparent opening 12a is provided in bracket 12. When the motor is viewed in the radial direction, from the position where magnet 4 and flexible base 8 overlap, this opening 12a is provided in the region where the outer end of the bracket 12d at opening 12a projects outward from case 1 and is within the range of extending tongue 12b, which is the power supply terminal's support. Tongue 12b has width y, which is greater than width x of opening 12a. As in the first embodiment, flexible base 8 leads out from case 1, through this opening 12a. Furthermore, opening 12c (FIG. 5) supports the shaft 3.

If each part of the motor is configured as in the second embodiment, the rotating rotor does not contact the flexible base, even if the rotor is shaped so as to project toward the bracket 12 side, as in the case of the rotor with reinforcing part Rx.

If the position of the end 12d is outside the position where rotor R projects toward bracket 12, the rotor does not contact the flexible base 8. However, as shown in FIGS. 4 and 5, if it positioned outside of the case 1, it is possible to avoid contact more reliably. Consequently, this enables the creation of a compact, low-profile motor, regardless of the rotor shape.

Also, tongue 12b is used as a means of providing transparent opening 12a within the range extending to the outer periphery of bracket 12, when viewed in the axial direction from the position where the magnet and flexible base overlap. So, it is possible to provide a transparent opening, without increasing the outside diameter of bracket 12 and without reducing the strength of the bracket. Consequently, it is possible to create a compact, low-profile motor, while maintaining the outside diameter and strength of the motor.

Each of the aforementioned embodiments exemplifies a vibration motor, but the present application can be used in known, ordinary rotary motors.

The present invention is configured as aforementioned, so even if the bracket is thinner than 0.2 mm, for example, it is possible to configure it such that the brush base leads to the side periphery, by means of a simple process that forms a transparent opening, without utilizing an impractical means (e.g., pressing with a press).

Also, including the adhesion layer, the thickness of the flexible base is, for example, approximately 0.18 mm, so it is possible to produce an extremely thin motor, without increasing the overall thickness of the bracket and motor, by easily leading it out to the periphery of the motor through the opening.

Explanation of Symbols

| | |
|---|---|
| H, H1 | Housing |
| 1 | Case |

-continued

| | |
|---|---|
| 1a | Burring transparent opening |
| 2 | Bracket |
| 2a | Transparent opening |
| 2b | Tongue |
| 3 | Shaft |
| 3a | Shaft base end |
| 4 | Ring magnet |
| 5 | Flat commutator |
| 6, 7 | Pair of brushes |
| 6a, 7a | Patterns |
| 8 | Flexible base |
| 9 | Flexible printed-wiring board |
| 12 | Bracket |
| 12a | Transparent opening |
| 12b | Tongue |
| 12c | Transparent opening |
| 12d | End |
| B | Bearing |
| P | Polyesterimide |
| R, R2 | Eccentric rotor |
| Ra, Rb, Rc | Air-core armature coil |
| Rw | Weight |
| Rx | Reinforcing part |
| Y | Laser weld |

What is claimed is:

1. A motor comprising a housing having a case and a bracket, a rotor rotatably mounted in said housing, said rotor having an axis of rotation, said rotor having a commutator, a ring magnet in said housing axially spaced from said rotor, a base element mounted on said bracket, brushes in said housing having base end portions and tip end portions, said base end portions being secured to said base element and said tip end portions being disposed in sliding contact with said commutator, said base element having an extending part leading from said housing and forming a power supply terminal, said bracket having an opening disposed in superimposed relationship with said ring magnet, said base element having a first portion disposed on said bracket and a second protruding portion protruding from said first portion in an axial direction, said second protruding portion being disposed in said opening and disposed in superimposed relationship with said ring magnet.

2. A motor according to claim 1, wherein said bracket has a support portion which supports said power supply terminal, said bracket support portion having a width greater than the width of said opening, said widths being measured in a direction perpendicular to a radial direction.

3. A motor according to claim 1, wherein said base element includes a tongue which projects from the housing and which supports said power supply terminal.

4. A motor according to claim 1, wherein said rotor comprises a peripheral part which extends generally axially from the periphery of said rotor toward said bracket for effecting increased vibrations.

5. A motor according to claim 1, wherein said opening in said bracket has a first opening portion which accommodates said magnet and a second opening portion extending radially outwardly of said first opening portion.

6. A motor according to claim 5, wherein said bracket has a tongue extending radially from said housing, said tongue having a width greater than the width of said second opening portion.

7. A low profile motor comprising a housing a rotor rotatably mounted in said housing, said rotor having a commutator, a ring magnet in said housing axially spaced from said rotor, a base element secured to said housing, brushes in said housing having base end portions and tip end portions, said base end portions being secured to said base element and said tip end portions being disposed in sliding contact with said commutator, said base element having an extending part leading from said housing and forming a power supply terminal, said housing having an opening disposed in overlapping relationship with said ring magnet, said base element having a protrusion disposed in said opening and disposed in overlapping relationship with said ring magnet.

8. A low profile motor according to claim 7, wherein said base element has a generally flat portion and a depressed portion, said ring magnet being disposed in said depressed portion.

9. A low profile motor according to claim 7, wherein said base element has a depressed portion disposed in superimposed relationship with said protrusion, said ring magnet being disposed in said depressed portion.

10. A low profile motor according to claim 7, wherein said housing is a cylindrical housing, said protrusion being disposed on one diametrical side of said housing.

11. A low profile motor according to claim 7, wherein said opening extends through said housing.

12. A low profile motor according to claim 7, wherein said base element has a flat portion having two sides, said protrusion from one side of base element, said base element having a concave portion on the other side, said protrusion being disposed in said opening of said housing, said ring magnet being disposed in said concave portion of said base element.

13. A low profile motor according to claim 12, wherein said protrusion and said concave portion of said base element are disposed in superimposed relationship.

14. A low profile motor according to claim 7, wherein said opening in said base element has side walls, said protrusion having side walls juxtaposed to said base element side walls to facilitate retention of said protrusion in said opening.

15. A low profile motor comprising a housing, a rotor rotatably mounted in said housing, said rotor having a commutator, a ring magnet in said housing axially spaced from said rotor, a base element secured to said housing, brushes in said housing having base end portions and tip end portions, said base end portions being secured to said base element and said tip end portions being disposed in sliding contact with said commutator, said base element having an extending part leading from said housing and forming a power supply terminal, said housing having an opening disposed in overlapping relationship with said ring magnet, said base element having a protrusion and a recess, said protrusion being disposed in said opening, said ring magnet having a ring magnet portion disposed in said recess.

16. A low profile motor according to claim 15, wherein said protrusion is disposed in superimposed relationship with said recess.

* * * * *